J. L. CREVELING.
SYSTEM OF ELECTRICAL DISTRIBUTION.
APPLICATION FILED OCT. 1, 1909.
1,195,444.
Patented Aug. 22, 1916.
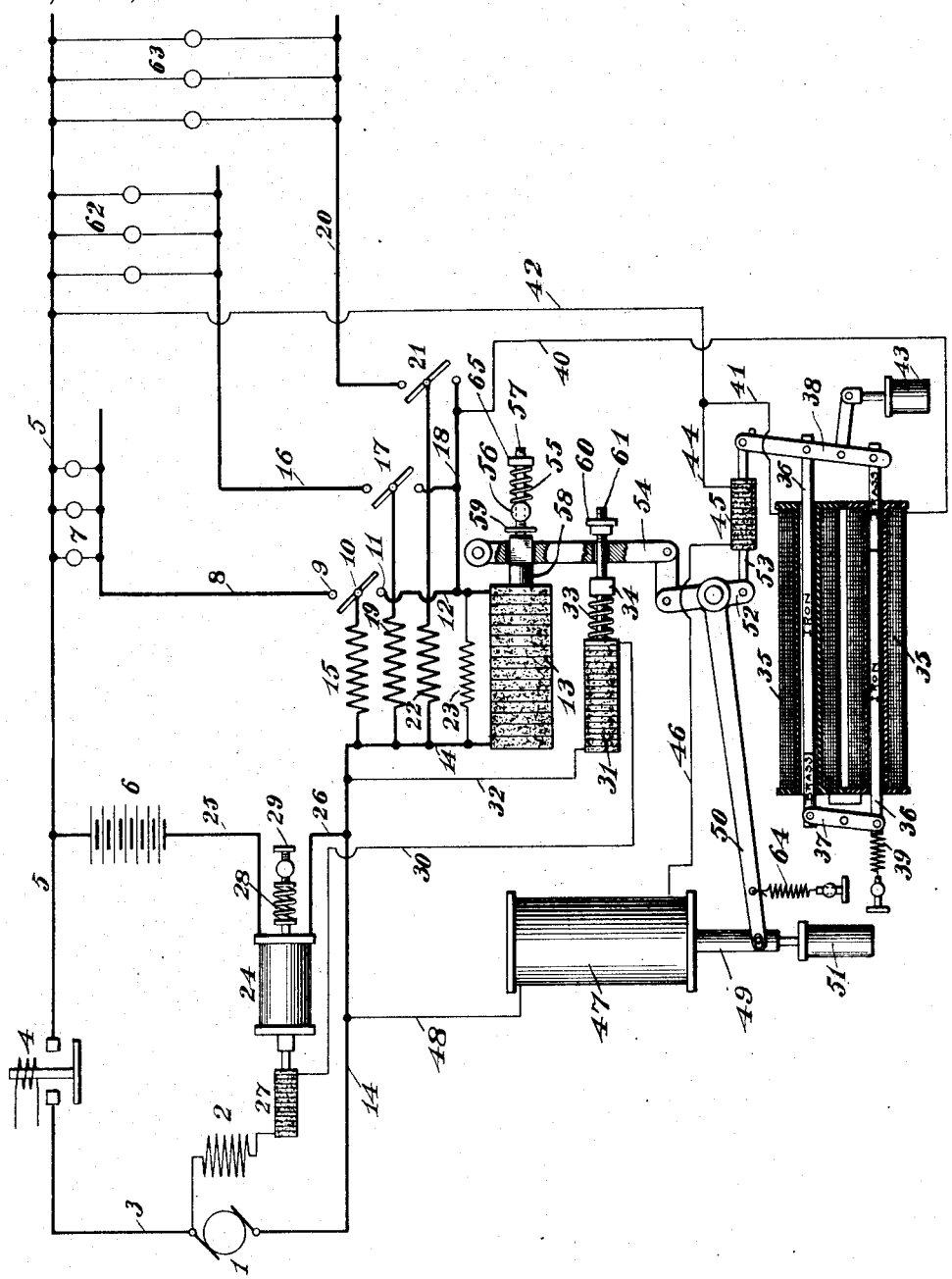
WITNESSES:
INVENTOR

UNITED STATES PATENT OFFICE.

JOHN L. CREVELING, OF NEW YORK, N. Y., ASSIGNOR TO SAFETY CAR HEATING AND LIGHTING COMPANY, A CORPORATION OF NEW JERSEY.

SYSTEM OF ELECTRICAL DISTRIBUTION.

1,195,444.  Specification of Letters Patent.  Patented Aug. 22, 1916.

Application filed October 1, 1909. Serial No. 520,493.

*To all whom it may concern:*

Be it known that I, JOHN L. CREVELING, a resident of New York, in the county and State of New York, have invented certain new and useful Improvements in Systems of Electrical Distribution, as set forth in the annexed specification and drawing, forming a part thereof.

My invention pertains to that class of systems of electrical distribution in which a dynamo or generator is automatically governed to perform various functions under varying conditions and in which the translation circuits are automatically controlled to meet certain varying conditions.

My invention has for its particular object to provide means whereby a dynamo tending to have a variable voltage shall have the same automatically regulated in such manner as to properly charge a storage battery in connection therewith and supply current to the lamps or translating devices at a substantially uniform voltage regardless of that necessary for the proper charging of the battery.

In the drawing I have shown in diagram one type of system of electrical distribution embodying my invention.

In said drawing 1 represents a dynamo or generator tending to have a more or less variable voltage as, for instance, one driven at variable speeds. The generator may be provided with a field energizing coil 2 connected with one of its brushes from which is carried the lead 3 to any suitable type of automatic switch as indicated at 4 from which is led the main 5 communicating with one side of the storage battery 6 and one side of the several groups of lamps or translating devices indicated at 7, 62 and 63 respectively. The opposite side of the translating devices 7 connects with the wire 8 which is carried to the terminal 9 of the switch 10 adapted, when closed, to cause connection between the terminals 9 and 11 from which latter terminal the wire 12 is carried to the variable resistance 13, in this instance shown as of the carbon disk variety for the sake of clearness. From the opposite side of the resistance 13 is led the wire 14 to the opposite brush of the generator 1. A shunt resistance 15 may be connected between the wire 14 and the switch 10 so that when the said switch is closed a portion of the current flowing from the lamps or translating devices 7 to the generator will pass through the said shunt 15 and thereby prevent the necessity of carrying the entire load through the resistance 13 as will hereinafter more plainly appear. The translating devices 62 are connected with the wire 16 which is led to the switch 17 adapted to connect the same with the wire 18 leading to the variable resistance 13 across which is placed the shunt 19 similar to the shunt 15 above described. The translating devices 63 communicate with the wire 20 which is led to the switch 21 adapted to connect the same with the wire 18 leading to the variable resistance 13 and across which may be placed the shunt resistance 22 similar to 15 above described. A comparatively high resistance shunt indicated at 23 may be permanently left across the terminals of the resistance 13 if desired for a purpose which will hereinafter more plainly appear.

24 is a solenoid in circuit with the storage battery 6 as by wires 25 and 26 which connect one side of the storage battery with the lead 14.

27 represents a variable resistance, in this instance as of the carbon disk variety which is placed in series with the field coil 2 and normally operated so as to be of low or negligible resistance as by means of compression spring 28 adjustable as by screw 29 shown in this instance as acting against the plunger of the solenoid 24 in such manner as to compact the carbons of the resistance 27. The opposite side of the resistance 27 is connected to the wire 30 which is led to one side of the variable resistance device 31, in this instance indicated as of the carbon disk variety and having its opposite terminal connected with the wire 32 which is carried to the lead 14. The compression spring 33 acting against the post 34 tends to compress the carbons 31 and reduce the resistance thereof to a minimum.

35 represents a pair of solenoids which may be provided with cores 36 carried by pivotally supported levers 37 and 38 and normally drawn in a direction opposite to that in which excitation of the solenoids 35 tend to move them as by means of adjustable spring 39. One end of the winding of the solenoids 35 is connected with the wire 40 which is carried to the wire 18 and the other end of said winding is connected with the wire 41 which is led to the wire 42 which is connected with the main 5.

43 represents a dash-pot adapted to prevent too sudden movement of the cores 36.

The wire 44 is carried from the wire 42 to one side of the resistance device 45 indicated as of the carbon disk variety and so arranged that movement of the cores 36 in a direction caused by the spring 39 increases the resistance thereof and motion in a reverse direction decreases the resistance thereof and the other side of the resistance device 45 is connected with the wire 46 leading to the windings of the solenoid 47 which windings are connected as by wire 48 with the lead 14. The solenoid 47 is provided with a core 49 adapted by its movement to actuate the lever 50, while 51 represents a dash-pot tending to resist too sudden movement of the said core 49. The lever 50 has connected therewith a short lever 52 attached to the member 53 so connected and so arranged that raising the lever 50 increases the resistance 45 through the instrumentality of the lever 52 and member 53. The lever 50 is also connected with the lever 54 in such manner that raising of the lever 50 moves the lever 54 in a right-handed direction.

55 is a compression spring pressing against the post 56 and adjustable nut 65 carried upon the threaded portion of the rod 57 which is free to move through the post 56 and tends to move the member 58 in such direction as to tend to reduce the pressure upon the carbons 13.

59 is an adjusting nut upon the rod 57 adapted to strike against the post 56 and limit the travel of the member 58 in a right-handed direction.

60 is an adjusting nut carried by the threaded portion of the rod 61 which passes freely through the lever 54 and post 34 and is so connected with the carbon resistance 31 that motion imparted to the said rod 61 in a right-handed direction will increase the said resistance 31.

The practical operation of my improved invention when embodied in a system as above described is substantially as follows starting with the generator at rest and the various instrumentalities in their respective positions shown in the drawing: If the generator be started a slight current will flow through the field winding 2, resistance device 27, wire 30, resistance device 31, wire 32 and lead 14 back to the generator and cause the field 2 to build up in a well-known manner. If the speed of the generator now increase until its voltage be that at which the automatic switch 4 is set to act the same will close in a well-known manner and if this voltage be in excess of that of the storage battery 6 and the lead 3 be considered as the positive lead, current will flow from the generator through the lead 3, switch 4, main 5, battery 6, wire 25, solenoid 24, wire 26 and lead 14 to the generator 1. This current flowing through the battery in passing through solenoid 24 will tend to increase the resistance 27 and cut down the field of the generator and it will be plain that by properly adjusting the spring 28, as by screw 29, the point at which the solenoid 24 will begin to cut down the output of the generator may be set so that the generator will only be cut down by this means when the battery is receiving the maximum charge that it should receive under any condition as, for instance, the maximum charge that it may be desired to put into the battery when in its most discharged condition. This current may be quite in excess of the normal charging rate and quite in excess of the normal discharge to the lamps or translating devices, thus current flowing from the battery to the lamps or translating devices through the magnet 24 when the dynamo is at rest will not cause the resistance 27 to be increased so as to tend to prevent the dynamo from building up as above described when started again in operation. Besides the current furnished to the battery and field as above outlined, current will also flow from the main 5 through the wire 42, wire 44, variable resistance 45, wire 46, solenoid 47 and wire 48 to the lead 14 and by proper adjustment of the resistance device 45 this current, under these conditions, may be made practically negligible and cause the solenoid 47 to have no appreciable effect upon its core 49. Current will also flow from the wire 42 through wire 41, solenoids 35, wire 40, wire 18, wire 12, adjusting shunt 23 and resistance 13 to the lead 14. This will tend to move the solenoid cores 36 in such manner as to reduce the resistance of the device 45 so as to increase current flowing through the solenoid 47 and cause the same to tend to raise its core 49 and by proper adjustment of the spring 39 the resistance 45 will be reduced when the voltage across the main 5 and lead 14 has reached a predetermined amount and this reduction in resistance 45 will then cause the solenoid 47 to raise its core 49 and thereby lift the lever 50 in such manner as to move the lever 54 in a right-handed direction. This will increase the resistance of the device 13 by reducing the pressure thereon until the nut 59 strikes against the post 56 and arrests any further movement of the member 58 by the spring 55. Further movement of the lever 54 in a right-handed direction will simply cause the same to back away from the shoulder portion of the member 58 and slide on that portion of the member 58 which is free to move through the said lever. This further movement however, by proper adjustment of the nut 60, will cause the lever 54 to engage the said nut and move the rod 61 in a right-handed direction so as to increase the resistance 31 and cut down the field of the generator and thus prevent its voltage rising above a predetermined amount at which the solenoids 35 are adjusted to act to reduce the resistance 45. It will be noted that when the lever 50 is raised so as to perform the above outlined functions the small lever 52, with its coöperating member 53, will move in such manner as to tend to increase the resistance 45. In practice I make this movement very small and it will be obvious that as soon as a certain pressure is exerted upon the resistance 45, through the instrumentality of solenoids 35, that pressure will cause the resistance 45 to lower and the lever 50 to immediately rise and this in turn tend to cause the resistance 45 to be increased; therefore, the pressure exerted by a given voltage through the instrumentality of solenoids 35 will determine a definite position of the lever 50 which will not go beyond such position owing to its reaction upon the resistance 45 which would tend to increase the same if the lever 50 moved beyond this definite point. Besides other advantages gained by this arrangement all tendency toward hunting is obviated.

If the maximum voltage which the solenoids 35, acting through the various instrumentalities as above set forth are adapted to hold constant, be chosen as the maximum charging voltage and if the storage battery 6 be in its normal operating condition—that is, not suffering from over-discharge or not charged until its voltage be above the normal working voltage the said battery will, under these conditions, receive a proper charge delivered from a source of constant voltage which charge will naturally taper off as the voltage of the battery rises and the solenoid 24 will, under these conditions, cause no appreciable effect in the resistance 27 and the further regulation will be carried on by the resistance device 31 operated as above described. If, however, the battery 6 be in a fully charged condition it will have a voltage approximately equal to that at which the solenoids 35 operate to hold the generator voltage constant and no appreciable charge will be given to the said battery and thus a useless waste of current and evaporation of electrolyte will be avoided. However, if the battery 6 be over-discharged and its voltage greatly reduced so that it would tend to take too great a charging current at the normal voltage the solenoid 24 will act to increase the resistance 27 when the maximum charge for which the same is set is reached and prevent an injurious charging rate. When the generator is running and the various instrumentalities in operation as above described, if the lamps be thrown on for example the group 7 as, by closing the switch 10, current will flow from the main 5 through the lamps 7, wire 8 to the switch 10 where it will divide and part return to the lead 14 through the shunt 15 and part through the wire 12 and variable resistance 13 to the lead 14 and, as above described, the adjustment of the nut 59 is such that when the solenoids 35 are causing the generator voltage to be held constant the resistance 13 is in circuit and with this so in circuit and the shunt 15 properly chosen the normal battery voltage may be impressed upon the lamps 7. By properly choosing the resistance of shunts 19 and 22 the normal voltage will also be impressed upon the other groups of lamps or translating devices under these conditions by the closing of their respective switches and speed variations in the generator will not cause fluctuations in voltage upon the lamps or translating devices inasmuch as the generator voltage will be held constant throughout these changes through the instrumentality of the solenoids 35 unless the generator now slow down until its voltage is insufficient to supply the total current used by the lamps or translating devices. Then, the solenoids 35 will allow the solenoid 47 to lower its core 49 and move the lever 50 so as to practically cut out all of the resistance 31 and then further fall in the generator voltage will cause the lever 50 to descend farther and by so doing strike the member 58 and cause the carbons 13 to be compressed in such manner as to decrease the resistance 13 so as to decrease the resistance in series between the lamps or translating devices and the battery circuit to make up for the fall in voltage of the generator until the voltage of the generator be practically equal to that of the storage battery 6 when the switch 4 may be opened and the total resistance in series with the lamps or translating devices be practically short-circuited by the device 13 and the total current will be supplied to the translating devices by the battery 6 through a negligible resistance. If now the generator be started again and its voltage brought to that of the battery and the switch 4 closed some current will be delivered to the translating devices by the generator and the battery will be relieved of part of its load. If the voltage of the generator now be slightly increased it will supply the total current to the lamps and any further increase will tend to cause current to be delivered to the battery and also tend to cause a rise in voltage upon the translating devices. However, the solenoids 35 will now cause the solenoid 47 to raise the lever 50 and increase the resistance 13 in such manner as to increase the resistance in series with the lamps or translating devices and cause their voltage to be held constant throughout the rise in voltage of the generator until the same is delivering its maximum charging voltage at which point the lever 54 will engage the nut 60 and the nut 59 will engage the post 56, then any further tendency to rise in the generator voltage will cause the solenoids 35 to act in such manner as to cut down the generator field and hold its voltage constant and this being held constant will require no further insertion of resistance in the lamp circuit beyond the point determined by proper adjustment of the nut 59. Increases in speed of the generator will now cause no further increase in voltage and as the battery is charged its voltage will tend to rise until equal to that of the generator and the charge taper off gradually to zero, and the generator continue to supply the translating devices at a constant voltage which will be that impressed upon the battery less a constant which is determined by the resistance 13 and the various shunts. If the generator slow down the operation of the system may be readily followed from the description above given which will also serve to show its operation if it start up again either with or without lamps in circuit.

From the foregoing it will be obvious that I have produced a system of electrical distribution wherein a variable speed generator may be caused to automatically charge a storage battery at a constant potential and supply lamps or translating devices in connection therewith at uniform potential regardless of whether the entire current or a portion thereof be supplied by the generator or whether the entire current or a portion thereof be supplied by the battery. Further, it will be obvious that the automatic device performing the function of regulation in my improved system serves, by holding the potential upon the translating circuit constant, to cause the generator to have its voltage vary between predetermined limits so that its voltage shall be sufficiently in excess of that upon the lamps or translating devices as is necessary for the proper charging of the said battery.

I do not wish to limit myself to any of the details of construction, connection of circuits, design of apparatus, or exact modes of operation set forth in the foregoing description, since the same are given as a description of one type, merely, of a system comprehending the principles of my invention and from which wide variations may be made in matters of detail and operation without departing from the essential features of my invention, as set forth in the following claims.

Having thus described my invention what I consider novel and desire to protect by Letters Patents is as set forth in the following claims to wit:

1. The combination with a generator, a storage battery and translating devices adapted to be operated thereby, of a regulator for the translating devices and a regulator for the generator operated by the potential difference across the translating devices.

2. The combination with a generator, a storage battery and a translation circuit, of means for regulating the voltage of the generator and means coöperating therewith to regulate the translation circuit operated by the potential difference across the translation circuit.

3. The combination with a generator, a storage battery and a work circuit, means for regulating the potential across the work circuit and for maintaining a predetermined potential difference between the generator and the work circuit, and means coöperating with the said regulator to control the generator both previous and subsequent to the operation of the said regulating means.

4. The combination with a generator, a storage battery and a work circuit, of a regulator for the work circuit, a regulator for the generator and means whereby the voltage across the lamp circuit operates said regulators.

5. A system of electrical distribution comprehending a generator, a storage battery and a work circuit, combined with means for regulating the generator, means in series with the work circuit capable of altering the voltage thereof, means responsive to changes in voltage of the work circuit for operating said voltage altering means in such manner as to hold the voltage across the translating circuit substantially constant throughout certain changes in generator voltage, and means coöperating with the first means whereby said operating means regulates the generator voltage.

6. The combination with a generator, a storage battery and a translation circuit, of means depending upon the voltage of the translation circuit adapted to hold the same constant within predetermined limits and tending when said limits are reached to hold the generator voltage constant.

7. A system of electrical distribution comprehending a generator, a storage battery, a work circuit and means for affecting the voltage upon the work circuit, a coil across the work circuit for operating said means and means under the control of said coil for regulating the generator.

8. The combination with a generator, a storage battery and a work circuit and means for holding the generator voltage constant, combined with means whereby the voltage of the generator is lowered only when the same delivers a current to the storage battery in excess of a predetermined limit greater than its normal charging and discharging limits.

9. The combination with a generator, a storage battery and a work circuit, means for regulating the generator dependent upon the condition of the battery, means for regulating the generator dependent upon the condition of the work circuit, and means for causing both said regulating means to coöperate with each other.

JOHN L. CREVELING.

Witnesses:
  E. HALL,
  M. HERSKOVITZ.

Copies of this patent may be obtained for five cents each, by addressing the "Commissioner of Patents, Washington, D. C."